(12) United States Patent
Owada

(10) Patent No.: US 8,100,569 B2
(45) Date of Patent: Jan. 24, 2012

(54) VEHICLE HEADLIGHT

(75) Inventor: Ryotaro Owada, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 0 days.

(21) Appl. No.: 12/876,073

(22) Filed: Sep. 3, 2010

(65) Prior Publication Data

US 2011/0051448 A1 Mar. 3, 2011

(30) Foreign Application Priority Data

Sep. 3, 2009 (JP) ................................. 2009-204168

(51) Int. Cl.
*F21V 5/00* (2006.01)
(52) U.S. Cl. ............... 362/520; 362/311.02; 362/326; 362/507; 362/538; 362/547
(58) Field of Classification Search ............ 362/294, 362/311.01–311.02, 326, 487, 507, 509, 362/520, 538, 546–547, 800
See application file for complete search history.

(56) References Cited

U.S. PATENT DOCUMENTS

2009/0154185 A1 6/2009 Yagi

FOREIGN PATENT DOCUMENTS

| JP | 2009-21135 A | 1/2009 |
| JP | 2009-146665 A | 7/2009 |

*Primary Examiner* — Stephen F Husar
*Assistant Examiner* — Meghan Dunwiddie
(74) *Attorney, Agent, or Firm* — Kenealy Vaidya LLP

(57) ABSTRACT

A vehicle headlight can include an LED optical unit with a high cooling efficiency. The LED optical unit can include a projector lens, a lens holder including a frame that has a tapered portion, and an LED light source mounted on a base member. The base member can be located in the tapered portion of the frame to define an air flow space between the frame and the base member. The projector lens can be attached to the lens holder so as to face the light source. Cool air can flow from the air flow space towards the light source, and heat generated from the light source can flow toward the upward air flow space. The LED light source can be efficiently radiated even when it is located close to the projector lens. Thus, the vehicle headlight can be used for various vehicles including a small size car.

20 Claims, 15 Drawing Sheets

VEHICLE HEADLIGHT

This application claims the priority benefit under 35 U.S.C. §119 of Japanese Patent Application No. 2009-204168 filed on Sep. 3, 2009, which is hereby incorporated in its entirety by reference.

BACKGROUND

1. Field

The presently disclosed subject matter relates to an LED optical unit using an LED light source and a projector lens and vehicle headlights including the LED optical unit, and more particularly to the vehicle headlights including the LED optical unit having a high cooling efficiency even when the LED light source is located extremely close to a light incoming surface of the projector lens.

2. Description of the Related Art

Recently, various vehicle headlights using an LED light source have been developed. This development has been brought about because the LED light source has a long life and is battery friendly as compared with a light bulb, discharge lamp, etc. On the other hand, because the LED light source may generate a large amount of heat when the LED light source having a favorable light distribution is provided for the vehicle headlights, various cooling structures for the LED light source have been developed.

A conventional headlight shown in FIG. 14 is a projector headlight that is disclosed in patent document No. 1 (Japanese Patent Application Laid Open JP2009-21135). The projector headlight includes: an LED light source 34 mounted on a base substrate: a reflector 35 for reflecting light emitted from the LED light source 34: a projector lens 37 for emitting the light reflected by the reflector 35 with a predetermined light distribution pattern; a shade 36 for forming a cutoff line; a heat sink 39 to radiate a heat generated from the LED light source 34; a heat pipe 38 that transmits the heat of the LED light source 34 from the base substrate to the heat sink 39; a housing 31 for fixing the heat sink 39; a lens holder 33 that attaches the projector lens 37 and the shade 36 to the housing 31; and an outer lens 32.

In the above-described projector headlight, the heat developed by the LED light source 34 is transmitted from the base substrate to the heat sink 39 via the heat pipe 38 and is radiated from the heat sink 39. Accordingly, an increase of a junction temperature of an LED chip that is included in the LED light source 34 can be prevented.

In addition, when the projector headlight is provided with the reflector 35 that is composed of an ellipsoidal surface, the LED light source 34 may be located at a first focus of the reflector 35 and a second focus of the reflector 35 may be located at a focus of the projector lens 37. Therefore, because a distance between a light incoming surface of the projector lens 37 and the LED light source 34 may become relatively long, the projector lens 37 may be hardly influenced by the heat generated from the LED light source 34.

However, it is difficult to shorten a thickness between the projector lens 37 and the heat sink 39, although it is easy for the projector headlight to form a favorable light distribution pattern. Therefore, the conventional projector headlight may be difficult to package in a small size car. In order to reduce the thickness of the projector headlight, another conventional projector headlight shown in FIG. 15 is disclosed in patent document No. 2 (Japanese Patent Application Laid Open JP2009-146665).

The other conventional projector headlight includes: a lens holder 43 formed in a substantially hemispherical shape; an LED light source 44 mounted on a base substrate 48 that is attached on an inner surface of the lens holder 43; and a projector lens 47 attached to the lens holder 43 so that a light incoming surface thereof faces the LED light source 44. Accordingly, because the conventional projector headlight is not provided with a reflector unlike the projector headlight shown in FIG. 14, the thickness of the projector headlight may become thinner than that of the conventional projector headlight of FIG. 14.

However, the light incoming surface of the projector lens 43 is located extremely close to the LED light source 44, and therefore may be easily influenced by a heat generated from the LED light source 44. Consequently, the projector headlight is provided with a cutout section 43A over the LED light source 44 in the lens holder 43 as shown in FIG. 15. The heat generated from the LED light source 44 may be radiated from the cutout section 43A of the lens holder 43. Therefore, an increase of a junction temperature of an LED chip that is included in the LED light source 44 may be prevented.

However, in the conventional projector headlight shown in FIG. 15, although the cutout section 43A is provided over the LED light source 44 in the lens holder 43, the cutout section 43A may not be provided under the light source 44. Accordingly, the conventional projector headlight may not create an air flow between the light incoming surface of the projector lens 47 and the LED light source 44 so that the heat generated from the LED light source 44 can be efficiently radiated. Thus, the increase of the junction temperature of the LED chip that is included in the LED light source 44 may not be efficiently prevented.

The above-referenced Patent Documents are listed below and are hereby incorporated with their English abstracts in their entireties.
1. Patent document No. 1: Japanese Patent Application Laid Open JP2009-21135
2. Patent document No. 2: Japanese Patent Application Laid Open JP2009-146665

The disclosed subject matter has been devised to consider the above and other problems, characteristics and features. Thus, an embodiment of the disclosed subject matter can include a vehicle headlight including a small projector type LED optical unit that can radiate a heat generated from an LED light source with a high cooling efficiency and can be easily assembled with a simple structure. In this case, the vehicle headlight can be constructed from a single projector type optical unit that can be formed in a thin shape. Thus, the vehicle headlight can result in an increase in the possible range of headlight design, and therefore can be employed for various vehicles including a small size car.

SUMMARY

The presently disclosed subject matter has been devised in view of the above and other characteristics, desires, and problems in the conventional art. An aspect of the disclosed subject matter can include providing a small projector type LED optical unit for headlights that can efficiently radiate heat generated from an LED light source even when a light incoming surface of a projector lens is located extremely close to the LED light source in order to reduce the thickness of the LED optical unit. Another aspect of the disclosed subject matter can include providing vehicle headlights including the LED optical unit, which can be used for various vehicles including a small size car.

According to an aspect of the disclosed subject matter, an LED optical unit can include a lens holder having a tubular frame, a base member having a front surface and a peripheral surface, a projector lens having an optical axis and a light incoming surface, and an LED light source having an optical axis. The tubular frame of the lens holder can include a tubular plate that is located between a first opening and a second opening. The tubular plate can taper from the first opening towards the second opening and can include at least one slit, at least one contact plate and at least one hook. The at least one slit can be formed in a cup shape, and the at least one contact plate can be surrounded by the at least one slit and can have an elasticity while the at least one contact plate is provided with the at least one hook on an inner surface thereof.

In addition, the front surface of the base member can be located so as to become substantially parallel to the first opening of the lens holder, and the peripheral surface of the base member can include a plurality of ribs that contact with an inner surface of the lens holder. The ribs can be configured to attach the base member to the lens holder by locking at least one of the ribs with the at least one contact plate having the elasticity and the at least one hook in order to define an air flow space between the peripheral surface of the base member and the inner surface of the lens holder. The projector lens can be attached to the lens holder so that the tubular plate of the lens holder is located between the peripheral surface of the base member and the projector lens. The LED light source can be attached on the front surface of the base member so that the optical axis of the LED light source substantially aligns with the optical axis of the projector lens, wherein the LED light source can be spaced from the light incoming surface of the projector lens at a prescribed interval.

According to another aspect of the disclosed subject matter, the LED optical unit can further include a fixing member having an elasticity, which can be formed in a substantially rectangular shape and can be attached the base member to the lens holder from a rear surface of the base member with the elasticity thereof so that the air flow space can be defined between the peripheral surface of the base member and the inner surface of the lens holder. In this case, the at least one slit, the at least one contact plate and the at least one hook can be removed from the tubular plate of the lens holder.

In the above-described exemplary LED optical units, a heat pipe that can be connected to the base member. The above-described LED optical units further can include a heat sink that can be connected to the heat pipe. Each of the first opening and the second opening of the lens holder and the front surface of the base member can be formed in a rectangular shape. In addition, the LED optical unit can further include a flexible printed circuit board that mounts the LED light source thereon, wherein the LED light source is attached the front surface of the base member via the flexible printed circuit board. The LED light source also can include at least one blue LED chip.

According to the above-described exemplary LED optical units, the air flow space can be defined to extend continuously between the peripheral surface of the base member and the inner surface of the lens holder and between the light incoming surface of the projector lens and the LED light source. Thus, heat generated from the LED light source can be radiated with a high cooling efficiency because cool air can flow from the upward air flow space toward the LED light source and the hot air can flow from the LED light source toward the upward air flow space.

According to another aspect of the disclosed subject matter, a vehicle headlight including the LED optical unit further can include a housing; a fulcrum shaft having a fulcrum point located in the housing and configured such that the LED optical unit is revolvable or pivotable about the fulcrum point; a first screw configured to rotate the LED optical unit in a first direction about the fulcrum point and a second screw configured to rotate the LED optical unit in a second direction about the fulcrum point, the first direction being substantially normal to the second direction; and an outer lens located adjacent the housing.

In the above-described vehicle headlight including the LED optical unit, the vehicle headlight can be reduced in thickness because the projector lens can be located extremely close to the LED light source without a reflector. In addition, the vehicle headlight can allow adjustment of the LED optical unit for a favorable light distribution pattern with the two screws. Thus, the disclosed subject matter can provide vehicle headlights that can be used for various vehicles including a small size car.

BRIEF DESCRIPTION OF THE DRAWINGS

These and other characteristics and features of the disclosed subject matter will become clear from the following description with reference to the accompanying drawings, wherein.

DETAILED DESCRIPTION OF EXEMPLARY EMBODIMENTS

Figure 1:
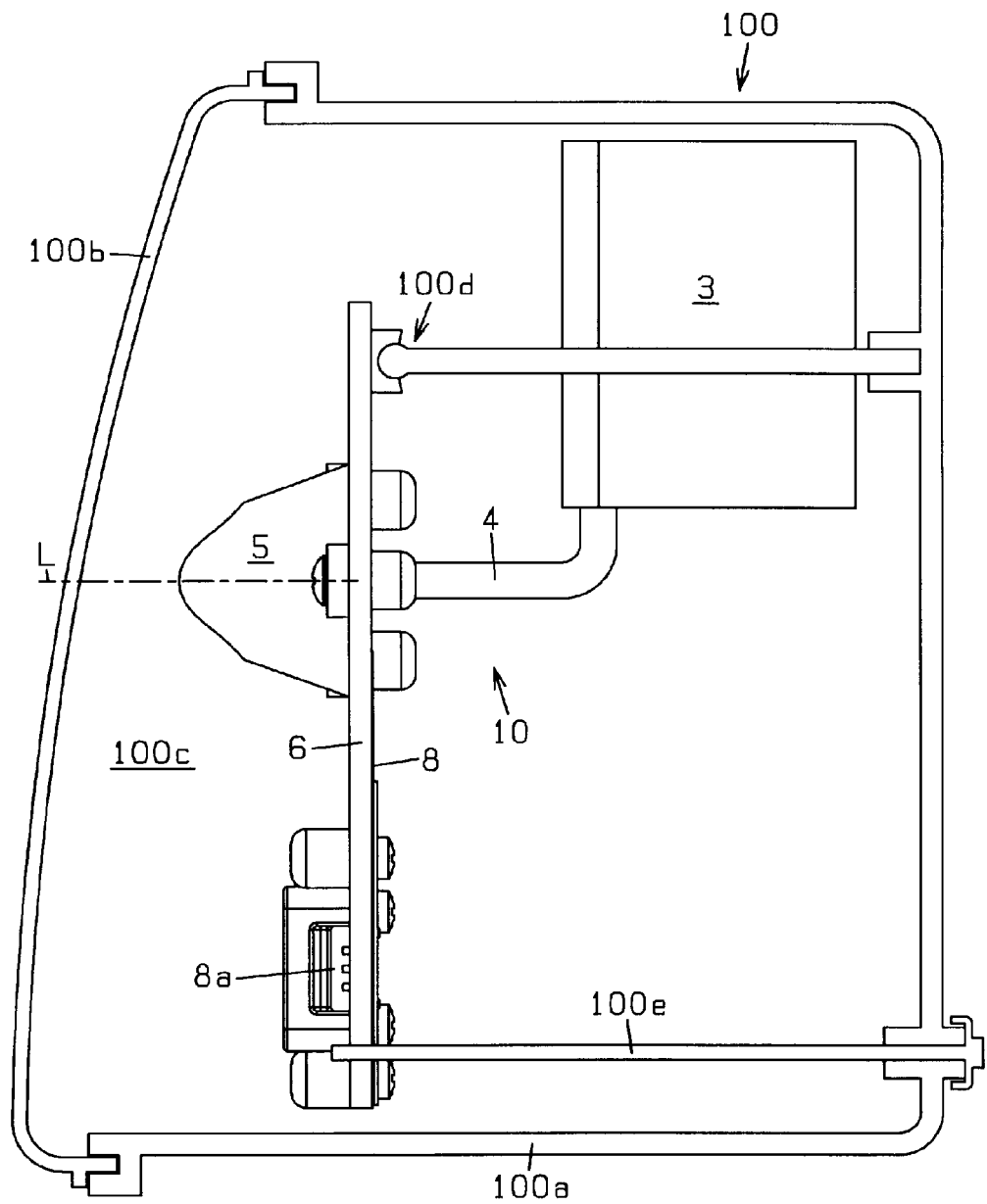
FIG. 1 is a schematic partial cross-section side view showing an exemplary embodiment of a vehicle headlight made in accordance with principles of the disclosed subject matter.

The disclosed subject matter will now be described in detail with reference to FIGS. 1 to 13, in which the same or corresponding elements use the same reference marks. FIG. 1 is a schematic partial cross-section side view showing an exemplary embodiment of a vehicle headlight 100 made in accordance with principles of the disclosed subject matter. A front and an upper side of the vehicle headlight 100 are leftward and upward in FIG. 1, respectively.

The vehicle headlight 100 can include: a housing 100a; an outer lens 100b attached to the housing 100a; an LED optical unit 10 located in a housing space 100c that is made by the housing 100a and the outer lens 100b; a fulcrum shaft 100d based on the housing 100a such that it can pivot when adjusting a light distribution pattern thereof; and an adjustment assembly. The adjustment assembly can include a first screw 100e configured to rotate the LED optical unit 10 in a first direction about a fulcrum point of the fulcrum shaft and a second screw (not illustrated) configured to rotate the LED optical unit 10 in a second direction about the fulcrum point, the first direction being substantially normal to the second direction.

The second screw can revolve portions of the LED optical unit 10 in a horizontal direction with respect to an optical axis L of the LED optical unit 100 in order to make adjustments in a horizontal direction of the light distribution pattern, and the first screw 102e can revolve portions of the LED optical unit 10 in a vertical direction with respect to the optical axis L in order to make adjustments in a vertical direction of the light distribution pattern.

Figure 2:
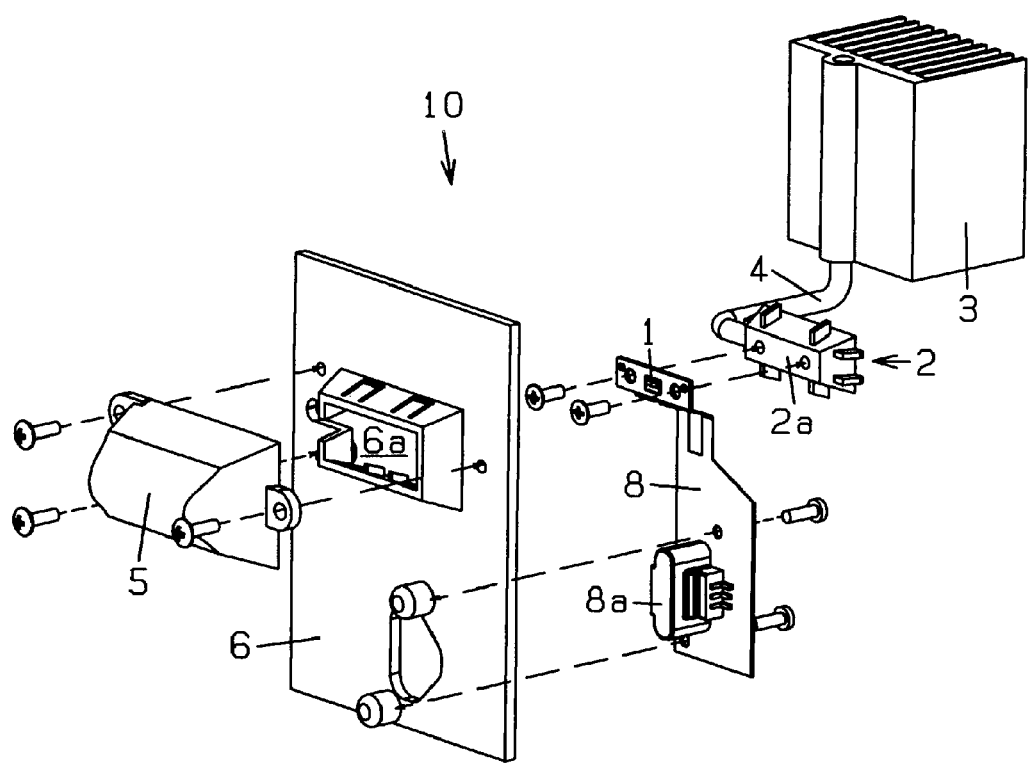
FIG. 2 is a perspective exploded view showing an exemplary LED optical unit of the vehicle headlight shown in FIG. 1.

FIG. 2 is a perspective exploded view showing the LED optical unit 10 of the vehicle headlight 100 of FIG. 1. The LED optical unit 10 can include: an LED light source 1; a circuit board 8 such as a flexible circuit board for mounting the LED light source 1 thereon; a base member 2 mounting the LED light source 1 on a front surface 2a thereof via the circuit board 8; a heat sink 3 radiating heat developed by the LED light source 1; a heat pipe 4 transmitting the heat of the LED light source 1 from the base member 2 to the heat sink 3; a projector lens 5 projecting light emitted from the LED light source 1 in a direction toward light-emission of the vehicle headlight 100; and a lens holder 6 attaching the projector lens 5 thereto.

In addition, the LED optical unit 10 can include a coupler 8a mounted on the circuit board 8 to supply a voltage source to the LED light source 1. The base member 2, the heat sink 3 and the heat pipe 4 can be composed of a high thermal conductive material such as a metallic material, etc. The lens holder 6 can be composed of a thermal insulating material (low thermal conductive material) such as a resin, and the projector lens 5 can be composed of a transparent material such as a polycarbonate resin, a glass, etc.

Figure 3:
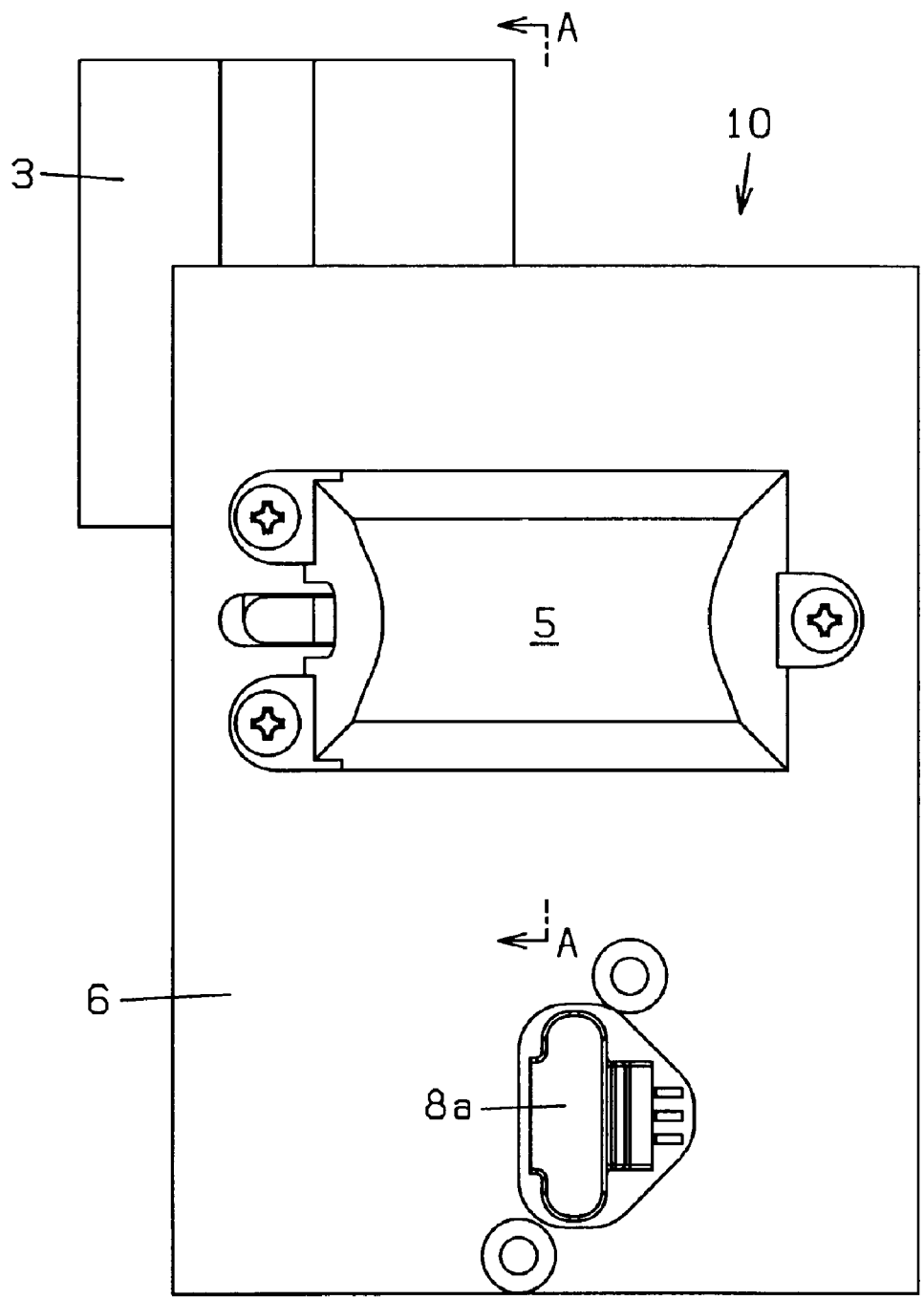
FIG. 3 is a front view showing the LED optical unit of FIG. 1.

The lens holder 6 can include a substantially planar portion and frame 6a extending from the substantially planar portion to hold the base member 2 along with the LED light source 1, which light source 1 is mounted on the circuit board 8. FIG. 3 is a front view showing an assembly of the LED optical unit 10 shown FIG. 2. The base member 2 can be attached to the circuit board 8 along with the LED light source 1 via screws.

The circuit board 8 can be attached to the lens holder 6 along with the base member 2 and the heat sink 3 via screws so that the base member 2 can be held into the frame 6a of the lens holder 6. Moreover, the LED optical unit 10 can be assembled by attaching the projector lens 5 to the lens holder 6 via crews. In this exemplary arrangement, the optical axis L of the optical unit 10 can align substantially with the optical axes of the projector lens 5 and the LED light source 1.

Figure 4A:
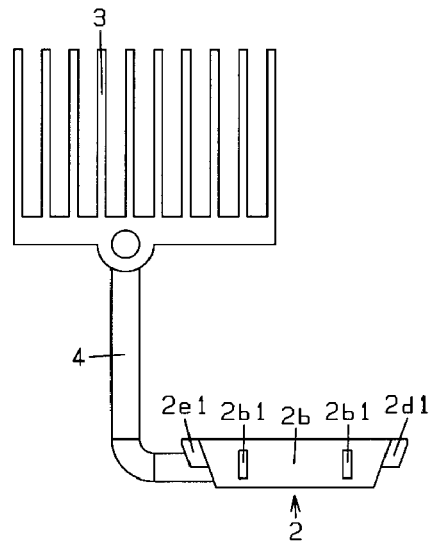
FIGS. 4a, 4b and 4c are, respectively, a top, side and front view showing a portion of the LED optical unit of FIG. 1.
Figure 4B:
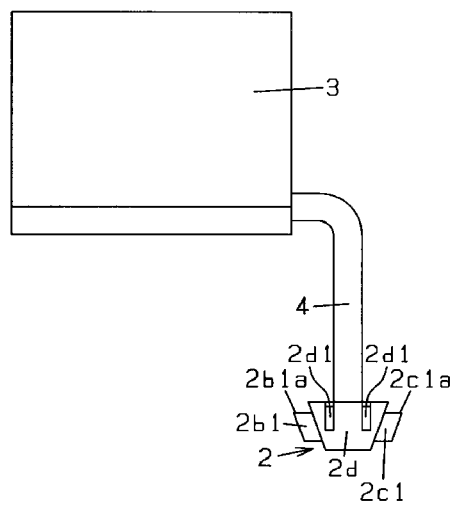
Figure 4C:
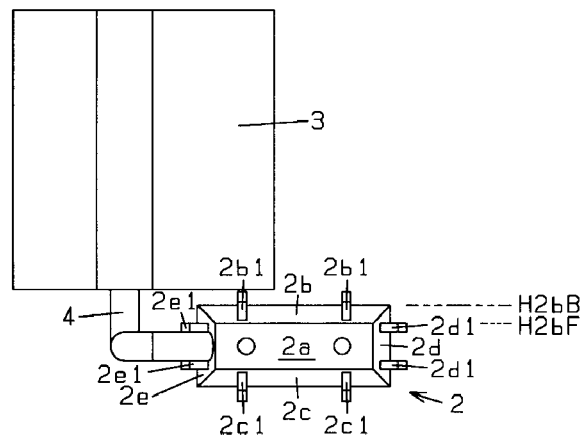
Figure 5A:
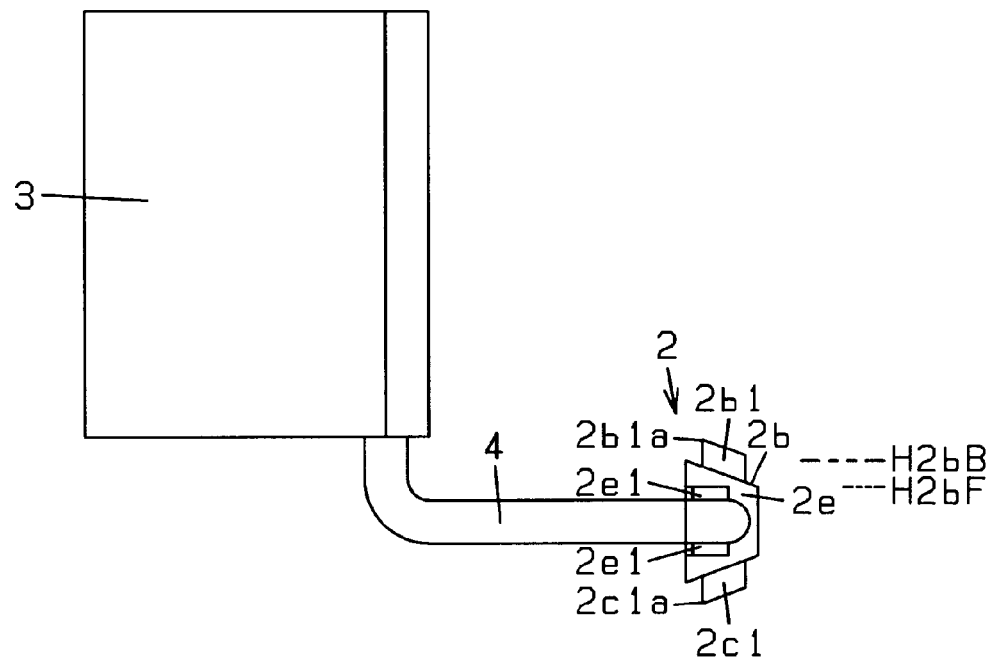
FIGS. 5a and 5b are another side view and a perspective view, respectively, showing the portion of the LED optical unit of FIGS. 4a to 4c.
Figure 5B:
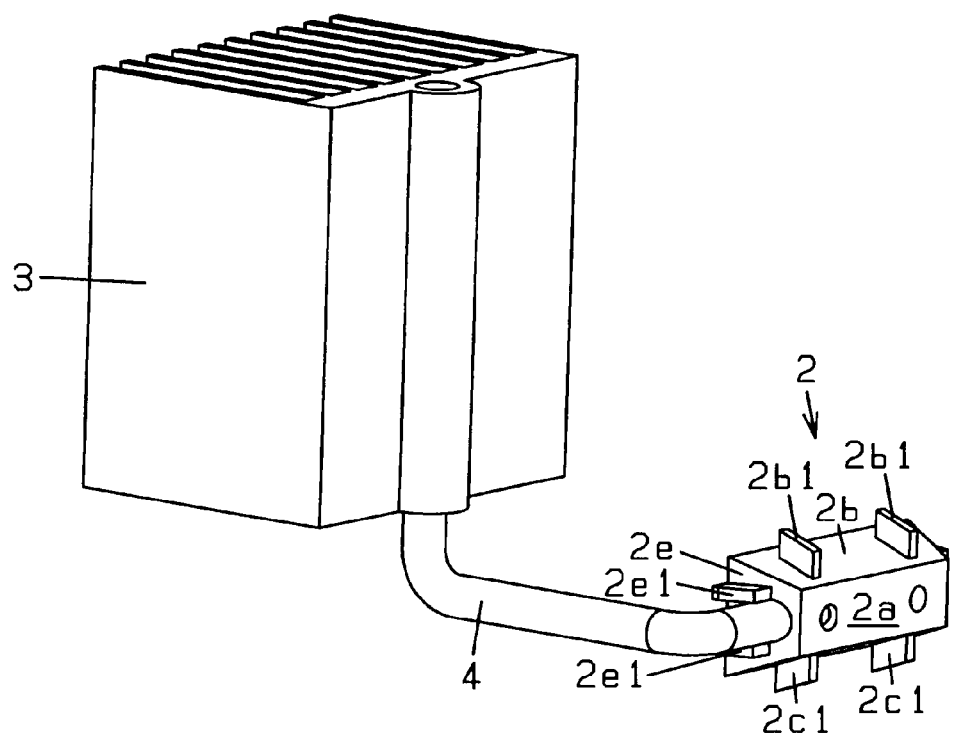

FIGS. 4a, 4b and 4c are a top, right side and front views showing an assembly of the base member 2, the heat sink 3 and the heat pipe 4 of the LED optical unit 10, respectively. FIGS. 5a and 5b are a left side view and a perspective view showing the assembly of the base member 2, the heat sink 3 and the heat pipe 4 shown in FIGS. 4a to 4c, respectively. The base member 2 can include a top surface 2b, an under surface 2c, a right side surface 2d and a left side surface 2e in addition to the front surface 2a, on which the LED light source 1 is mounted. The top surface 2b, under surface 2c, right side surface 2d and left side surface 2e can define a peripheral surface of the base member 2.

The top, under, right side and left side surfaces 2b-2e can taper toward the front surface 2a with respect to each other as shown in FIG. 4c. For example, with regard to the top surface 2b, a width measured along a top rear line H2bB can be wider than that measured along a top front line H2bF. The top front line H2bF is located closer to the front surface 2a than is the top rear line H2bB, and the top rear line H2bB is spaced relative to horizontal above the top front line H2bF. The under surface, right side and left side surfaces 2c-2e can be described in a similar manner.

The front surface can be formed in a substantially rectangular shape, and each of the top, under, right side and left side surfaces 2b-2e can be formed in a substantially trapezoidal shape. In addition, the top, under, right side and left side surfaces 2b-2e can include at least one top rib 2b1, at least one under rib 2c1, at least one right side rib 2d1 and at least one left side rib 2e1, respectively, as shown in FIG. 4a to FIG. 4c and FIGS. 5a-5b.

The ribs 2b1, 2c1, 2d1 and 2e1 can include a surface that slants toward the front surface 2a. The slanting surfaces of the at least one top rib 2b1 and the at least one under rib 2c1 can include a top rear end 2c1a and a under rear end 2c1a, respectively, that are located on the opposite side of the base member relative to the front surface 2a as shown in FIG. 4b and FIG. 5a. The top rear end 2c1a and the under rear end 2c1a will be described later.

Figure 6A:
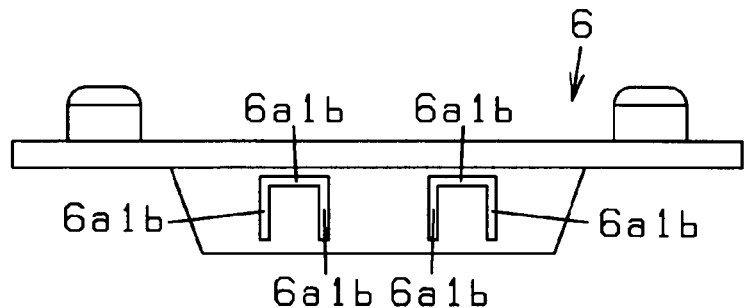
FIGS. 6a and 6b are a top and front view depicting another portion of the LED optical unit of FIG. 1.
Figure 6B:
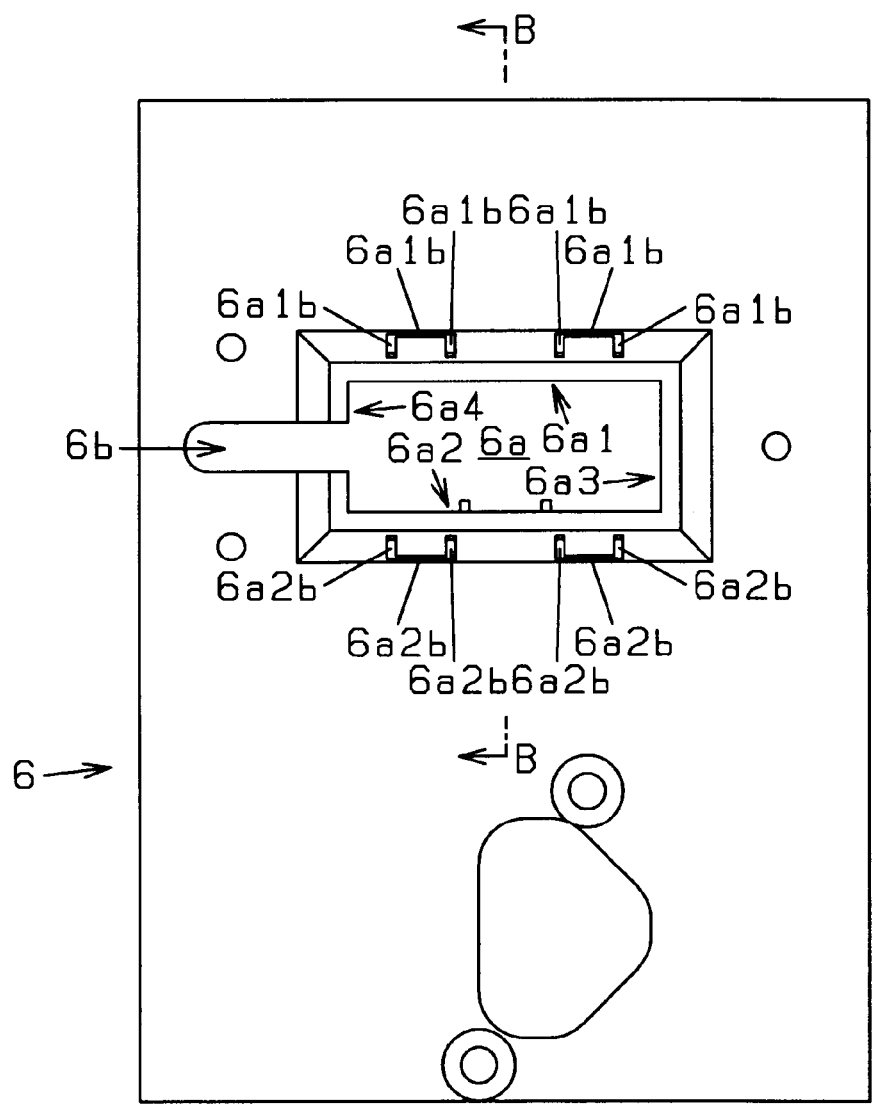
Figure 7A:
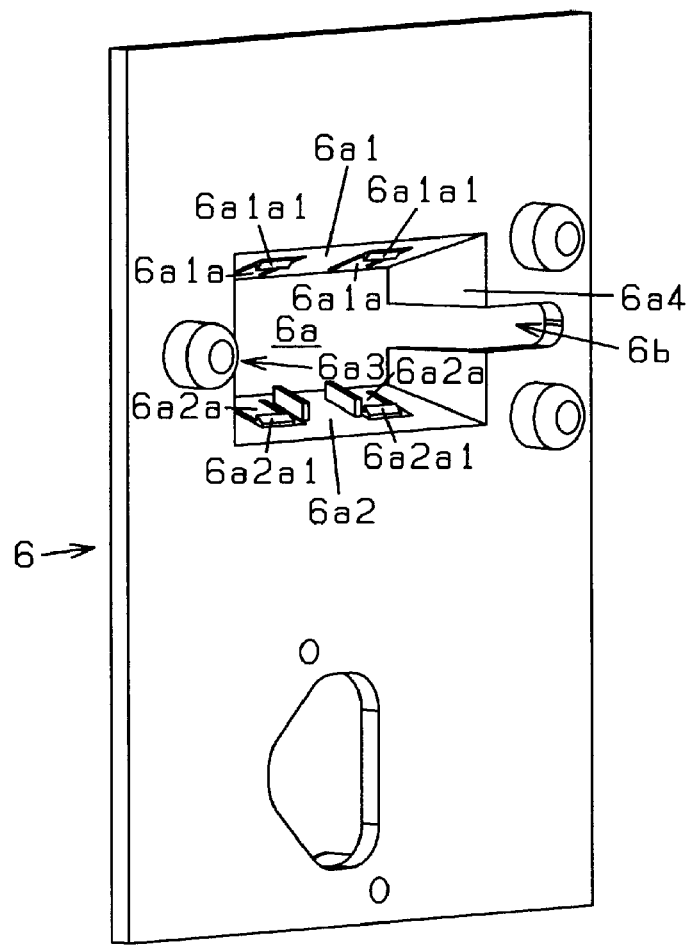
FIG. 7a is a perspective view depicting the portion shown in FIGS. 6a-6b.
Figure 7B:
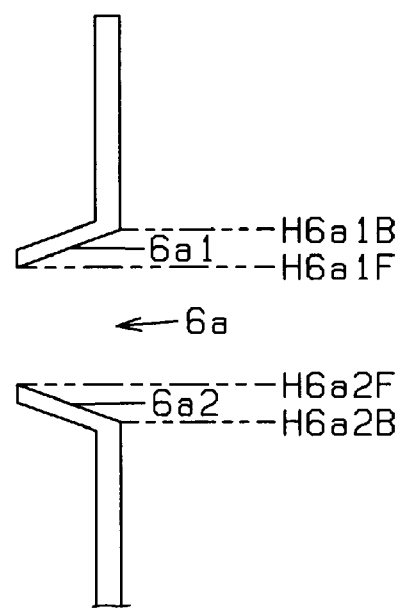
FIG. 7b is a cross-section view taken along line B-B shown in FIG. 6b.

FIGS. 6a and 6b are a top view and a front view depicting the lens holder 6 the LED optical unit 10. FIG. 7a is a rear perspective view depicting the lens holder 6 shown in FIGS. 6a-6b, and FIG. 7b is a cross-section view of the lens holder 6 taken along the line B-B shown in FIG. 6b. The lens holder 6 can include a substantially planar portion and a frame 6a that can be tubular in shape and include a first opening and a second opening spaced from the first opening. The first and second openings can cooperate to allow light emitted from the LED light source 1 to pass through towards the projector lens 5. The lens holder 6 can include a crosswise hole 6b that extends through the frame 6a and the substantially planar portion through which the heat pipe 4 can extend from the base member 2 towards the heat sink 3.

In addition, the frame 6a of the lens holder 6 can include an inner top surface 6a1, an inner under surface 6a2, an inner right side surface 6a3 and an inner left side surface 6a4 to hold the base member 2 therein so as to project towards the projector lens 5 as shown in FIG. 7a. The inner top surface 6a1, the inner under surface 6a2, the inner right side surface 6a3 and the inner left side surface 6a4 can taper towards the projector lens 5 (i.e. from the second opening towards the first opening) with respect to each other so as to contact the at least one top rib 2b1, the at least one under rib 2c1, the at least one right side rib 2d1 the and at least one left side rib 2e1 of the base member 2.

For example, as shown in FIG. 7b, an inner top rear line H6a1B of the inner top surface 6a1 can be located above an inner top front line H6a1F of the inner top surface 6a1 with respect to horizontal, and a width of the edge of the inner top surface 6a1 intersecting the inner top rear line H6a1B can be wider than that of the edge of the inner top surface 6a1 intersecting the inner front line H6a1F. Similarly, a position of an inner under front line H6a2F of the inner under surface 6a2 can be located above an inner under rear line H6a2B of the inner under surface 6a2 with respect to horizontal, and a width of the edge of the inner under surface 6a2 intersecting the inner under front line H6a2F can be wider than that of the edge of the inner under surface 6a2 intersecting the inner under rear line H6a2B.

Each of the first and second openings can be formed in a substantially rectangular shape, and each of the inner top surface 6a1, the inner under surface 6a2, the inner right side surface 6a3 and the inner left side surface 6a4 can be formed in a substantially trapezoidal shape. Moreover, the inner top surface 6a1 and the inner under surface 6a2 can include at least one top slit 6a1b and at least one under slit 6a2b, respectively, which slits 6a1b, 6a2b can be substantially cup-shaped as shown in FIG. 6b.

Accordingly, as shown in FIG. 7a, at least one top contact plate 6a1a surrounded by the top slit 6a1b and at least one under contact plate 6a2a surrounded by the under slit 6a2b can include an elastic characteristic in a vertical direction of the top surface 6a1 and the under surface 6a2, respectively. Furthermore, the at least one top contact plate 6a1a and the at least one under contact plate 6a2a can include a top hook 6a1a1 and a under hook 6a2a1, which are located adjacent to the top slit 6a1b and the under slit 6a2b of the opposite sides of the projector lens 5, respectively.

Thus, when the base member 2 is held in the tubular frame 6a of the lens holder 6, each of the at least one top rib 2b1, the at least one under rib 2c1, the at least one right side rib 2d1 and the at least one left side rib 2e1 of the base member 2 can slide on the inner top surface 6a1, the inner under surface 6a2, the inner right side surface 6a3 and the inner left side surface 6a4 of the tubular frame 6a of the lens holder 6, respectively, and finally the base member 2 can be held in the tubular frame 6a of the lens holder 6 by locking each of the top rear end 2c1a and the under rear end 2c1a of the base member 2 with each of the top hook 6a1a1 and the under hook 6a2a1 of the tubular frame 6a.

Figure 8A:
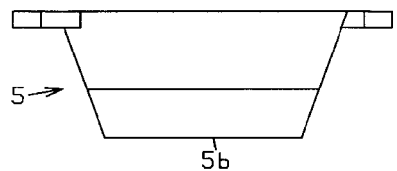
FIGS. 8a, 8b, 8c and 8d are respectively a top, left side, front, and right side view showing an exemplary projector lens that can be used with the LED optical unit.
Figure 8B:
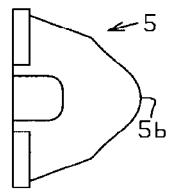
Figure 8C:
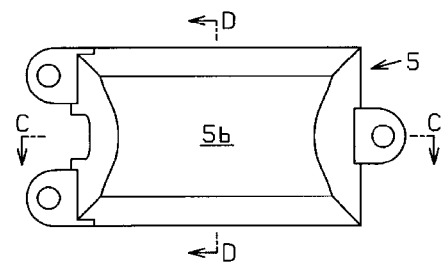
Figure 8D:
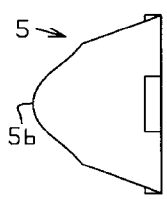
Figure 8E:
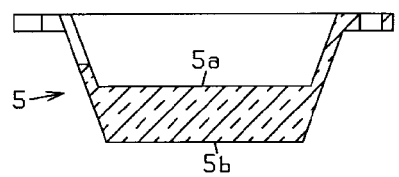
FIGS. 8e and 8f are cross-section views taken along line C-C and line D-D shown in FIG. 8c, respectively.
Figure 8F:
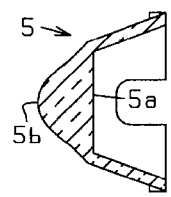

FIGS. 8a, 8b, 8c and 8d are respectively a top, left side, front and right side views showing the projector lens 5 of the LED optical unit 10, and FIGS. 8e and 8f are cross-section views of the projector lens 5 taken along the line C-C and the line D-D shown in FIG. 8c, respectively. The projector lens 5 can include a light incoming surface 5a that faces the LED light source 1, and can include a light-emitting surface 5b to project the light emitted from the LED light source 1 in a direction towards the light-emission of the vehicle headlight 100.

In this case, each shape of the light incoming surface 5a and the light-emitting surface 5b can be formed in accordance with a prescribed light distribution pattern of the vehicle headlight 100. In addition, as shown in FIG. 2, the frame 6a of the lens holder 6 that is composed of the thermal insulating material can be located between the projector lens 5 and the base member, and the LED light source 1 can be mounted thereon via the circuit board 8. Accordingly, except for direct heat emitted from the LED light source 1, a large part of the heat generated from the LED light source 1 may be insulated by the frame 6a of the lens holder 6.

Figure 9A:
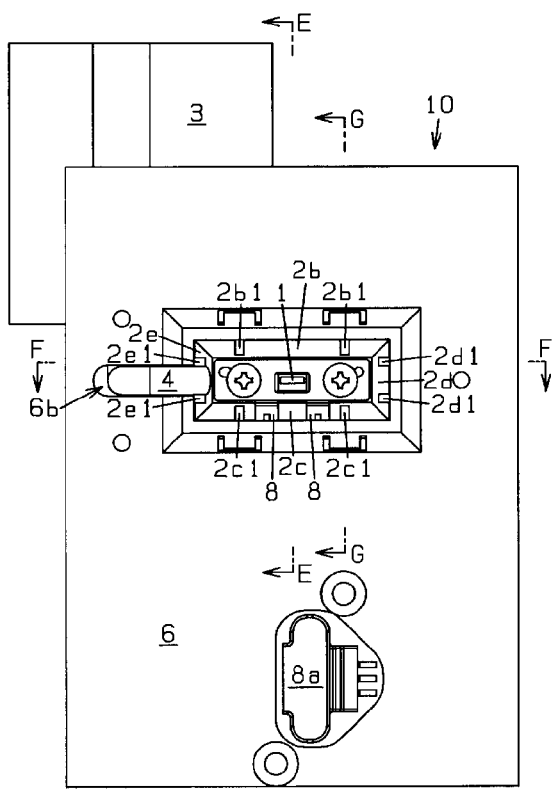
FIG. 9a is a front view showing the LED optical unit of FIG. 1 in which the projector lens is removed.
Figure 9B:
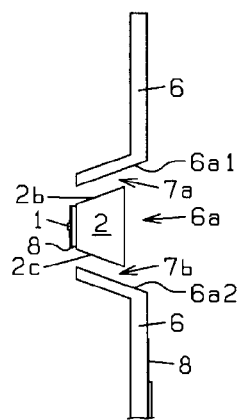
FIGS. 9b and 9c are cross-section views taken along line E-E and line F-F shown in FIG. 9a, respectively.
Figure 9C:
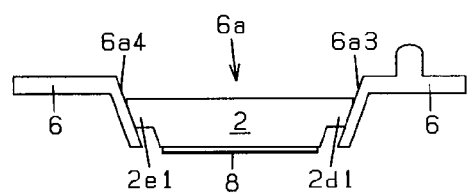
Figure 10A:
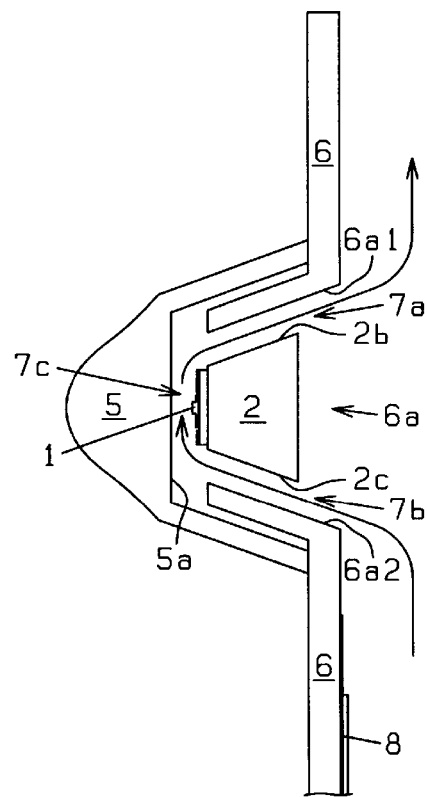
FIGS. 10a and 10b are cross-section views of the LED optical unit taken along the line A-A shown in FIG. 3 and line G-G shown in FIG. 9a, respectively.
Figure 10B:
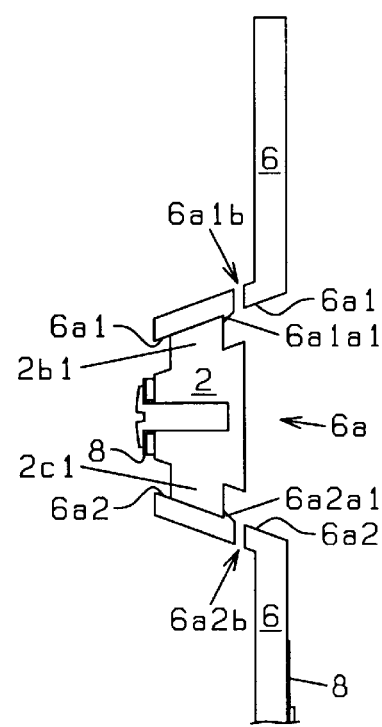

The cooling structure of the disclosed subject matter will now be described in more detail. FIG. 9a is a front view showing the LED optical unit 10 in which the projector lens 5 is removed, and FIGS. 9b and 9c are cross-section views of the lens holder 6 and the base member 2 taken along the line E-E and the line F-F shown in FIG. 9a, respectively. FIGS. 10a and 10b are cross-section views of a portion of the LED optical unit 10 taken along line A-A shown in FIG. 3 and line G-G shown in FIG. 9a, respectively.

According to the cooling structure shown in these figures, a first air flow space 7a can be formed between the top surface 2b of the base member 2 and the inner top surface 6a1 of the lens holder 6, and a second air flow space 7b can be formed between the under surface 2c of the base member 2 and the inner under surface 6a2 of the lens holder 6 as shown in FIG. 9A. In addition, a third air flow space 7c can be formed between the light incoming surface 5a of the projector lens 5 and the LED light source 1 as shown in FIG. 10a.

In this case, the second opening of the lens holder 6 can become parallel to the first opening of the tubular frame 6a, which is located towards the projector lens 5. The front surface 2a of the base member 2 can also become parallel to the first opening of the frame 6a in the lens holder 6. Thereby, the optical axis of the projector lens 5 can easily correspond to the optical axis of the LED light source 1. In addition, an efficiency of the cooling structure can be improved.

That is to say, as shown by an arrow in FIG. 10a, the direct heat generated from the LED light source 1 may create a less dense light air adjacent thereto due to the heat, and the hot less dense air can be exhausted from the third air flow space 7c along with the heat generated from the top surface 2b via the first air flow space 7a. Moreover, a cool air can flow from the second air flow space 7b towards the third air flow space 7c so as to replace the hot less dense air that is exhausted from the third air flow space 7c.

Accordingly, while the hot air developed by the LED light source 1 is exhausted from the third air flow space 7c via the first air flow space 7a, the cool air can flow into the third air flow space 7c, which is located between the LED light source 1 and the light incoming surface 5a of the projector lens 5. In this arrangement, air flow spaces can be formed between the right side surface 2c of the base member 2 and the inner right side surface 6a3 of the lens holder 6, and between the left side surface 2d of the base member 2 and the inner left side surface 6a4 of the lens holder 6. Consequently, the cooling structure can be efficiently operated.

Moreover, the top, under, right side and left side surfaces 2b-2e of the base member 2 can taper toward the front surface 2a with respect to each other, and also the inner top surface 6a1, the inner under surface 6a2, the inner right side surface 6a3 and the inner left side surface 6a4 can taper from the second opening towards the first opening with respect to each other. Thus, because the first air flow space 7a, the second air flow space 7b and the third air flow space 7c can continuously extend upwards, it is easy for the cooling structure to exhaust the hot air of the LED light source 1 and to intake the cool air into the third air flow space 7c of the LED light source 1.

Furthermore, according to the above-described cooling structure, while the cooling structure is efficiently operated, the base member 2 including the LED light source 1 can be attached to the lens holder 6 in a reliable manner. As shown in FIG. 9c, the right side rib 2d1 of the base member 2 can contact closely with the inner right side surface 6a3 of the lens holder 6 using the same slanted angle with respect to each other to define the right air flow space between the right side surface 2d and the inner right side surface 6a3, and also the left side rib 2e1 of the base member 2 can contact closely with the inner left side surface 6a4 of the lens holder 6 using the same slanted angle with respect to each other to define the left air flow space between the left side surface 2e and the inner left side surface 6a4.

Similarly, as shown in FIG. 10b, the top rib 2b1 of the base member 2 can contact closely with the top surface 6a1 of the lens holder 6 using the same slanted angle with respect to each other to define the first air flow space 7a between the top surface 2b and the inner top surface 6a1, and also the under rib 2c1 of the base member 2 can contact closely with the inner under surface 6a2 of the lens holder 6 using the same slanted angle with respect to each other to define the second air flow space 7b between the under surface 2c and the inner under surface 6a2.

In this arrangement, the top contact plate Ga1a surrounded by the top slit 6a1b and the under contact plate 6a2a surrounded by the under slit 6a2b can fix the base member 2 with the elastic characteristic thereof. In addition, each of the top hook 6a1a1 and the under hook 6a2a1 that are located adjacent to the top slit 6a1b and the under slit 6a2b can lock a movement of the base member 2 while associating with the top contact plate 6a1a and the under contact plate 6a2a. Therefore, when the base member 2 is attached to the lens holder 6, the base member 2 can be easily attached to the lens holder 6 by plugging the base member 2 into the tubular frame 6a of the lens holder 6. As a result, assembly of the base member 2 with the lens holder 6 can be simplified into a one-step process. However, other structures and/or methods can be used to secure the base member 2 to the lens holder 6.

Furthermore, even when the base member 2 is attached to a flexible circuit board 8 such as the flexible printed circuit board that mounts the LED light source 1 thereon, the base member 2 can be attached reliably to the lens holder 6 along with the circuit board 8 while the third air flow space 7c creates at a prescribed interval between the LED light source 1 and the light incoming surface 5a of the projector lens 5. Cases where the base member 2 is easily attached to the lens holder 6 by screws will now be described.

Figure 11A:
FIGS. 11a, 11b and 11c are a top, front and side view showing a first exemplary fixing member, respectively, for use with a vehicle headlight in accordance with the disclosed subject matter.
Figure 11B:
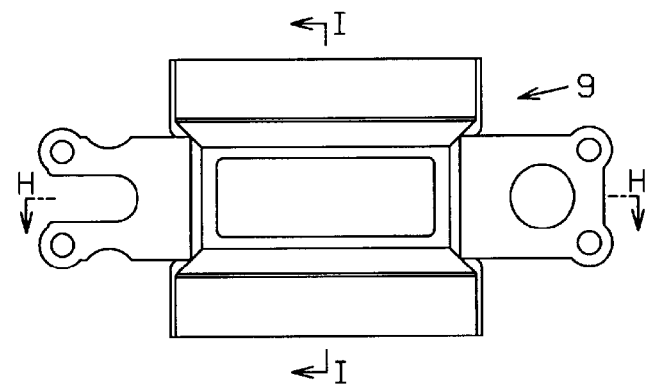
Figure 11C:
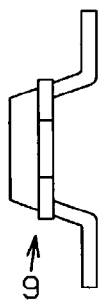
Figure 11D:
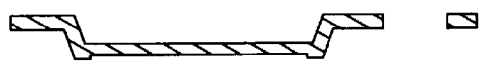
FIGS. 11d and 11e are cross-section views taken along line H-H and line I-I shown in FIG. 11b.
Figure 11E:
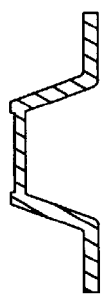

FIGS. 11a, 11b and 11c are a top, front and side views showing a first exemplary fixing member, respectively, and FIGS. 11d and 11e are cross-section views of the first exemplary fixing member 9 taken along the line H-H and the line I-I shown in FIG. 11b. When the base member 2 is attached to the lens holder 6 using the first fixing member 9, the base member 2 can be set at a prescribed position in a temporary holder of the first fixing member 9, and the first exemplary fixing member 9 can be attached to the lens holder 6 along with the base member 2 via screws.

The first exemplary fixing member 9 can be composed of a high thermal conductive material such as a metallic material and the like, and can include a top plate and an under plate so as to extend in the vertical direction thereof. The first exemplary fixing member 9 can increase the efficiency of the cooling structure due to the extended top and under plates. In this arrangement, the first exemplary fixing member 9 can be attached to the lens holder 6 so that the top and under plates do not seal the first air flow space 7a and the second air flow space 7b and so that they extend along the lens holder 6.

The first exemplary fixing member 9 can efficiently radiate the heat generated from the LED light source 1, and therefore can eliminate the heat sink 3 and the heat pipe 4 from the LED optical unit 10 in accordance with a specification of the vehicle headlight 100. The fixing member 9 can allow for variations in the structure of the LED optical unit 10.

Figure 12A:
FIGS. 12a, 12b and 12c are a top, front and side view showing a second exemplary fixing member, respectively, for use with a vehicle headlight in accordance with the disclosed subject matter.
Figure 12B:
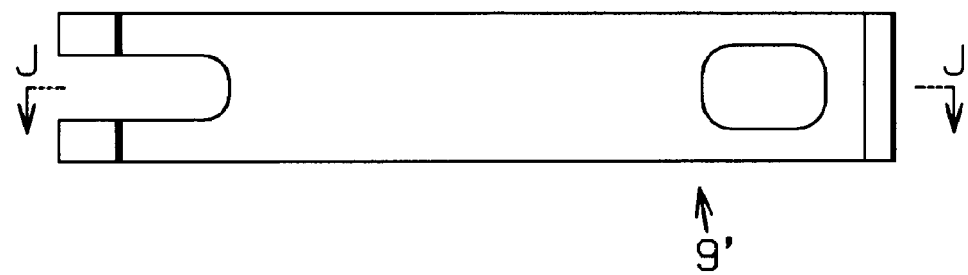
Figure 12C:
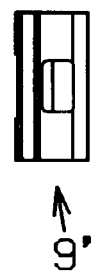
Figure 12D:
FIG. 12d is a cross-section view taken along line J-J shown in FIG. 12b.

FIGS. 12a, 12b and 12c are a top, front and side views showing a second exemplary fixing member 9', respectively, and FIG. 12d is a cross-section view of the second exemplary fixing member 9' taken along the line J-J shown in FIG. 12b. The second exemplary fixing member 9' can include a leaf spring portion and a screw hole. The base member 2 can be attached to the lens holder 6 via the leaf spring portion that is located at a left end part of the second exemplary fixing member 9' and a screw via the screw hole, which is located at the right end part of the second exemplary fixing member.

The second exemplary fixing member 9' can radiate the heat generated from the LED light source 1 from the first and second air flow space 7a and 7b, and can radiate the heat transmitted to the base member 2 from the high thermal conductive material thereof. The LED optical unit 10 including the second exemplary fixing member 9' can efficiently radiate the heat generated from the LED light source 1. In the second exemplary fixing member 9', the temporary holder for the base member 2 can be provided at a prescribed portion by bending parts of the plate.

Figure 13A:
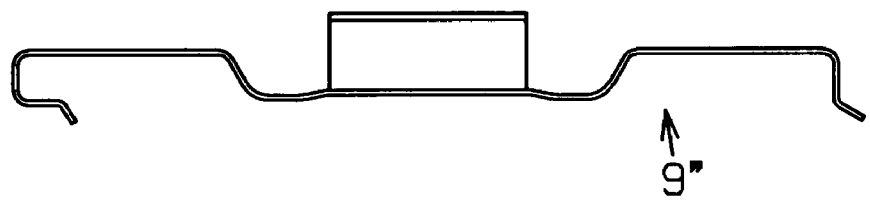
FIGS. 13a, 13b and 13c are a top, front and side view showing a third exemplary fixing member, respectively, for use with a vehicle headlight in accordance with the disclosed subject matter.
Figure 13B:
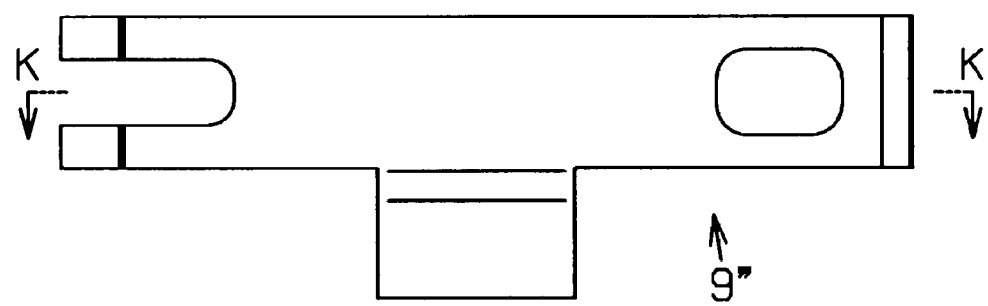
Figure 13C:
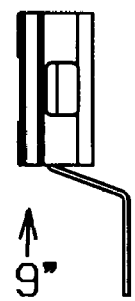
Figure 13D:
FIG. 13d is a cross-section view taken along line K-K shown in FIG. 13b.
Figure 14:
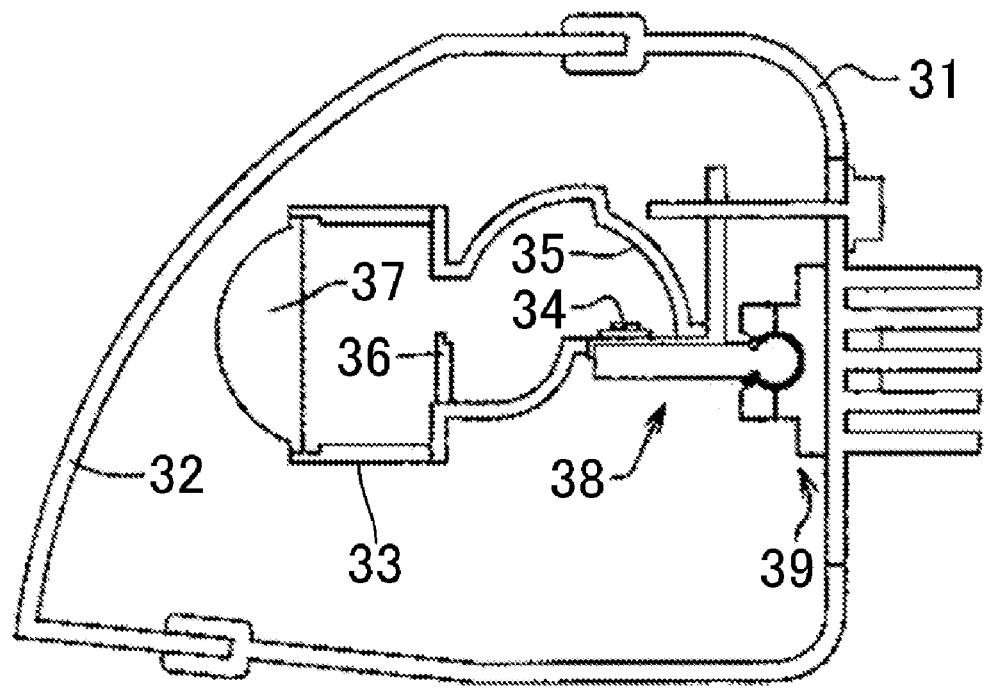
FIG. 14 is a schematic cross-section view showing a conventional projector headlight.
Figure 15:
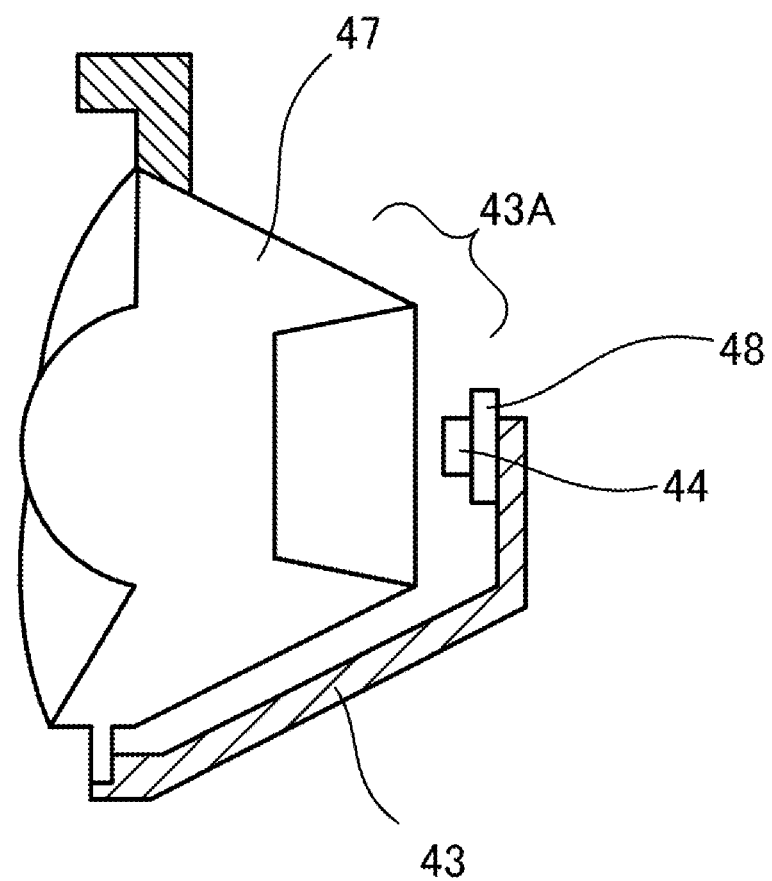
FIG. 15 is a schematic cross-section view showing another conventional projector headlight.

FIGS. 13a, 13b and 13c are a top, front and side view showing a third exemplary fixing member 9''', respectively, and FIG. 13d is a cross-section view of the third exemplary fixing member 9''' taken along the line K-K shown in FIG. 13b. The third exemplary fixing member 9''' is configured to add an under plate to the second exemplary fixing member 9'. Cool air that is located at lower portion of the project headlight 100 can flow into the second air flow space 7b via the under plate while a radiating area is increased by the under plate.

As described above, the disclosed subject matter can provide vehicle headlights having an advantageous cooling structure. The above-described LED light source 1 can be composed of a white LED, and the white LED can be composed of a blue LED chip and a yellow phosphor such as YAG (yttrium aluminum garnet), etc. A forward voltage of the blue LED chip is generally higher than other color LED chips such as a red LED chip and the like. Accordingly, because the blue LED chip may develop a large amount of heat, the above-described structure can be useful to produce projector type LED optical unit 10 that is minimized in size.

According to the disclosed subject matter, the LED optical unit 10 can allow the projector lens 5 and the LED light source 1 to be located in a tight space, and also can radiate the heat generated from the LED light source 1 with a high cooling efficiency even when the projector lens 5 is located extremely close to the LED light source 1. Thus, the vehicle headlight 100 including the LED optical unit 10 can be minimized in thickness. Furthermore, even when the vehicle headlight 100 is formed in a small size for a small size car, the vehicle headlight 100 can provide an advantageous light distribution with the adjusting screws and can radiate the large amount of heat with a high cooling efficiency due to the above-described cooling structure.

Various modifications of the above disclosed embodiments can be made without departing from the spirit and scope of the presently disclosed subject matter. For example, a headlight can include a plurality of LED optical units using the above-described structure so as to form a light distribution with the plurality of LED optical units, and total heat generated from the LED optical units can be separately radiated while the heat generated from each of the LED light sources of the LED optical units is minimized.

While there has been described what are at present considered to be exemplary embodiments of the invention, it will be understood that various modifications may be made thereto, and it is intended that the appended claims cover such modifications as fall within the true spirit and scope of the invention. All conventional art references described above are herein incorporated in their entirety by reference.

What is claimed is:

1. An LED optical unit, comprising:
   a lens holder having a first portion and a frame extending from the first portion, the frame defining a first opening, a second opening and including an inner surface, the frame being located between the first opening and the second opening, tapering from the first opening towards the second opening so that the first opening and the second opening become substantially parallel with respect to each other, and the frame including at least one slit, at least one contact plate and at least one hook, the at least one slit being substantially cup-shaped, the at least one contact plate surrounded by the at least one slit and having an elasticity in an inner direction of the frame, and the at least one hook being located on the inner surface of the contact plate of the frame and being located adjacent the at least one slit;
   a base member having a front surface and a peripheral surface, the front surface being positioned substantially parallel to the first opening of the lens holder, the peripheral surface including a plurality of ribs that contact with the inner surface of the lens holder, and the plurality of ribs configured to attach the base member to the lens holder by locking at least one of the ribs with the at least one contact plate and the at least one hook in order to define an air flow space between the peripheral surface of the base member and the inner surface of the lens holder;
   a projector lens having an optical axis and a light incoming surface, and the projector lens attached to the lens holder so that the frame of the lens holder is located between the peripheral surface of the base member and the projector lens; and
   an LED light source having an optical axis and attached on the front surface of the base member so that the optical axis of the LED light source substantially aligns with the optical axis of the projector lens, wherein the LED light source is configured to be spaced from the light incoming surface of the projector lens at a prescribed interval.

2. The LED optical unit according to claim 1, further comprising:
   a heat pipe connected to the base member; and
   a heat sink connected to the heat pipe.

3. The LED optical unit according to claim 1, wherein each of the first opening and the second opening of the lens holder and the front surface of the base member is formed in a rectangular shape, and the frame is tubular in shape between the first opening and second opening.

4. The LED optical unit according to claim 2, wherein each of the first opening and the second opening of the lens holder and the front surface of the base member is formed in a rectangular shape.

5. The LED optical unit according to claim 1, further comprising:
   a flexible printed circuit board having the LED light source mounted thereon, wherein the LED light source is attached to the front surface of the base member via the flexible printed circuit board.

6. The LED optical unit according to claim 2, further comprising:
   a flexible printed circuit board having the LED light source mounted thereon, wherein the LED light source is attached to the front surface of the base member via the flexible printed circuit board.

7. The LED optical unit according to claim 1, wherein the LED light source includes at least one blue LED chip.

8. The LED optical unit according to claim 2, wherein the LED light source includes at least one blue LED chip.

9. An LED optical unit, comprising:
   a lens holder having a first portion and a frame extending from the first portion, the frame defining a first opening, a second opening and including an inner surface, the frame being located between the first opening and the second opening, and the frame tapering from the first opening towards the second opening so that the first opening and the second opening become substantially parallel with respect to each other;
   a base member having a front surface, a rear surface and a peripheral surface, the front surface being positioned substantially parallel to the first opening of the lens holder, and the peripheral surface including a plurality of ribs that contact with the inner surface of the lens holder;
   a fixing member having an elasticity formed in a substantially rectangular shape and attaching the base member to the lens holder from the rear surface of the base member with the elasticity of the fixing member so that an air flow space is created between the peripheral surface of the base member and the inner surface of the lens holder;
   a projector lens having an optical axis and a light incoming surface, and the projector lens attached to the lens holder so that the frame of the lens holder is located between the peripheral surface of the base member and the projector lens; and
   an LED light source having an optical axis attached on the front surface of the base member so that the optical axis of the LED light source substantially aligns with the optical axis of the projector lens, wherein the LED light source is configured to be spaced from the light incoming surface of the projector lens at a prescribed interval.

10. The LED optical unit according to claim 9, wherein the fixing member further extends in at least one of an upward direction and an under direction of the fixing member along the lens holder while keeping the air flow space.

11. The LED optical unit according to claim 9, further comprising:
    a heat pipe connected to the base member; and
    a heat sink connected to the heat pipe.

12. The LED optical unit according to claim 10, further comprising:
    a heat pipe connected to the base member; and
    a heat sink connected to the heat pipe.

13. The LED optical unit according to claim 9, wherein each of the first opening and the second opening of the lens holder and the front surface of the base member is formed in a rectangular shape, and the frame is tubular in shape between the first opening and second opening.

14. The LED optical unit according to claim 10, wherein each of the first opening and the second opening of the lens holder and the front surface of the base member is formed in a rectangular shape.

15. The LED optical unit according to claim 9, wherein the LED light source includes at least one blue LED chip.

16. The LED optical unit according to claim 10, wherein the LED light source includes at least one blue LED chip.

17. A vehicle headlight including the LED optical unit according to claim 1, further comprising:
    a housing;

a fulcrum shaft having a fulcrum point located in the housing and configured such that the LED optical unit is pivotable about the fulcrum point;

an adjustment assembly configured to rotate the LED optical unit in a first direction about the fulcrum point and configured to rotate the LED optical unit in a second direction about the fulcrum point, the first direction being substantially normal to the second direction; and an outer lens located adjacent the housing.

18. A vehicle headlight including the LED optical unit according to claim 2, further comprising:

a housing;

a fulcrum shaft having a fulcrum point located in the housing and configured such that the LED optical unit is pivotable about the fulcrum point;

an adjustment assembly configured to rotate the LED optical unit in a first direction about the fulcrum point and configured to rotate the LED optical unit in a second direction about the fulcrum point, the first direction being substantially normal to the second direction; and an outer lens located adjacent the housing.

19. A vehicle headlight including the LED optical unit according to claim 9, further comprising:

a housing;

a fulcrum shaft having a fulcrum point located in the housing and configured such that the LED optical unit is pivotable about the fulcrum point;

an adjustment assembly configured to rotate the LED optical unit in a first direction about the fulcrum point and configured to rotate the LED optical unit in a second direction about the fulcrum point, the first direction being substantially normal to the second direction; and an outer lens located adjacent the housing.

20. A vehicle headlight including the LED optical unit according to claim 10, further comprising:

a housing;

a fulcrum shaft having a fulcrum point located in the housing and configured such that the LED optical unit is pivotable about the fulcrum point;

an adjustment assembly configured to rotate the LED optical unit in a first direction about the fulcrum point and configured to rotate the LED optical unit in a second direction about the fulcrum point, the first direction being substantially normal to the second direction; and an outer lens located adjacent the housing.

\* \* \* \* \*